(12) United States Patent
Annibal Junior et al.

(10) Patent No.: US 9,764,413 B2
(45) Date of Patent: Sep. 19, 2017

(54) WIRE FEED TIP CLEANING APPARATUS

(71) Applicant: CATERPILLAR BRASIL LTDA, Piracicaba (BR)

(72) Inventors: Edenilson Guimarães Annibal Junior, Piracicaba (BR); Helaydson Ricardo Silva, Piracicaba (BR)

(73) Assignee: Caterpillar Brazil Ltda., Sao Paulo (BR)

( * ) Notice: Subject to any disclaimer, the term of this patent is extended or adjusted under 35 U.S.C. 154(b) by 663 days.

(21) Appl. No.: 14/348,257

(22) PCT Filed: Sep. 28, 2012

(86) PCT No.: PCT/BR2012/000401
§ 371 (c)(1),
(2) Date: Mar. 28, 2014

(87) PCT Pub. No.: WO2013/056330
PCT Pub. Date: Apr. 25, 2013

(65) Prior Publication Data
US 2014/0246053 A1 Sep. 4, 2014

(30) Foreign Application Priority Data
Sep. 30, 2011 (GB) .................................. 1116920.8

(51) Int. Cl.
*B23K 9/32* (2006.01)
*B08B 1/00* (2006.01)

(52) U.S. Cl.
CPC .............. *B23K 9/328* (2013.01); *B08B 1/005* (2013.01)

(58) Field of Classification Search
CPC ...... F23D 14/50; B23D 79/023; B23D 79/025
See application file for complete search history.

(56) References Cited

U.S. PATENT DOCUMENTS

| 3,562,842 A | | 2/1971 | Turnipseed |
| 4,918,286 A | | 4/1990 | Boyer |
| 5,221,826 A | * | 6/1993 | Lee ......................... B23K 9/328 15/93.1 |
| 5,845,357 A | * | 12/1998 | Anderson ........... B05B 15/0208 15/104.05 |

(Continued)

FOREIGN PATENT DOCUMENTS

JP    11 285884 A    10/1999

OTHER PUBLICATIONS

English Machine Translation of JP 11-285884.*
International Search Report dated Mar. 1, 2013 in International Application No. PCT/BR2012/000401.

*Primary Examiner* — Nicole Blan

(57) ABSTRACT

An apparatus and method for cleaning fabrication equipment, such as for example wire feed tips provided on welding guns. Equipment of that nature usually includes an outlet through which joining or filling material is dispensed and which may easily become blocked by weld splatter or the like when in such close proximity to the work piece being fabricated. The apparatus provides a support means for holding the equipment, cleaning means for removing debris from the equipment, and control means for effecting relative movement of the support means and cleaning means in a swift and efficient manner.

6 Claims, 4 Drawing Sheets

(56) References Cited

U.S. PATENT DOCUMENTS

2005/0269430 A1* 12/2005 Bodie .................... B05B 1/202
            239/550
2007/0000892 A1* 1/2007 Binder .................... B08B 1/04
            219/136

* cited by examiner

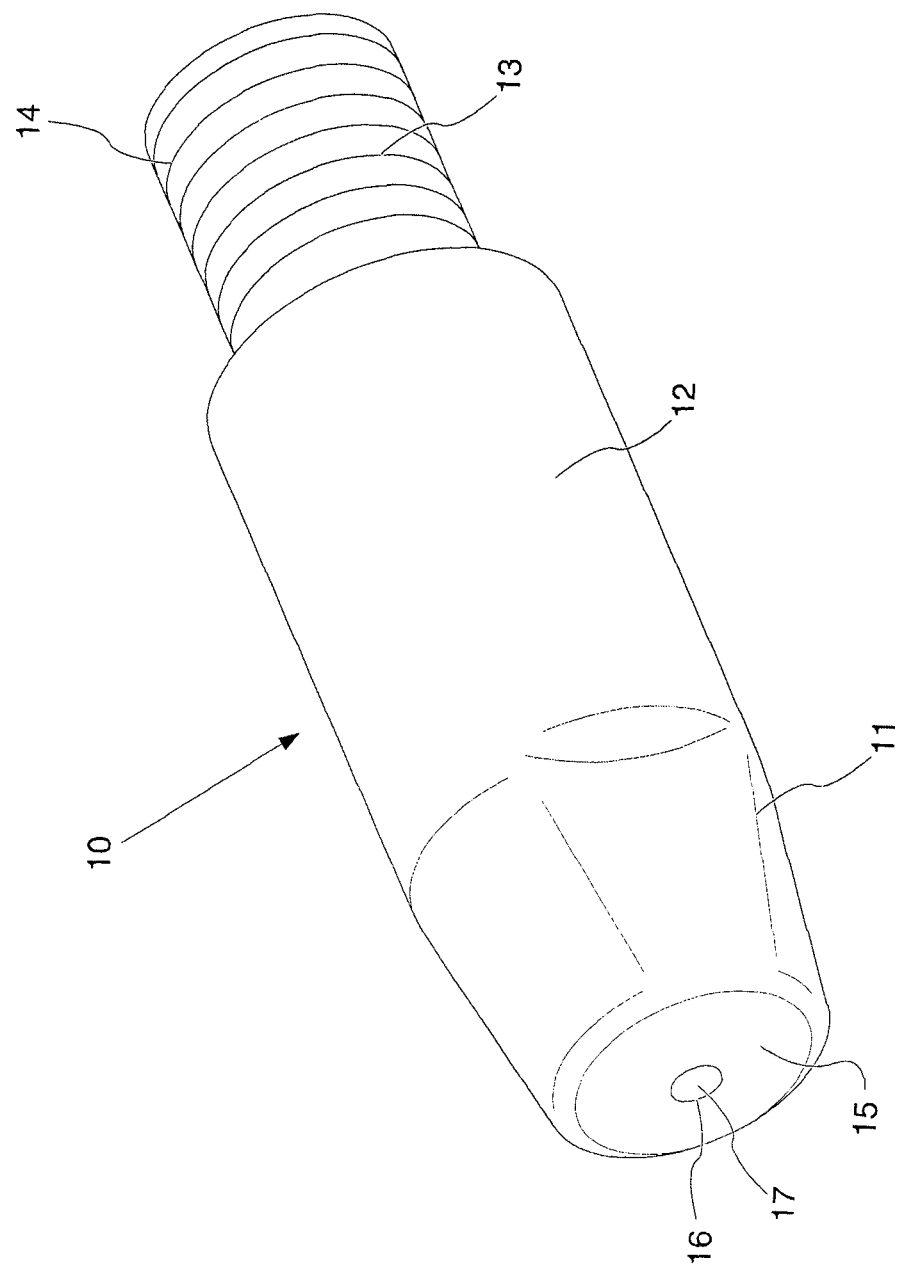

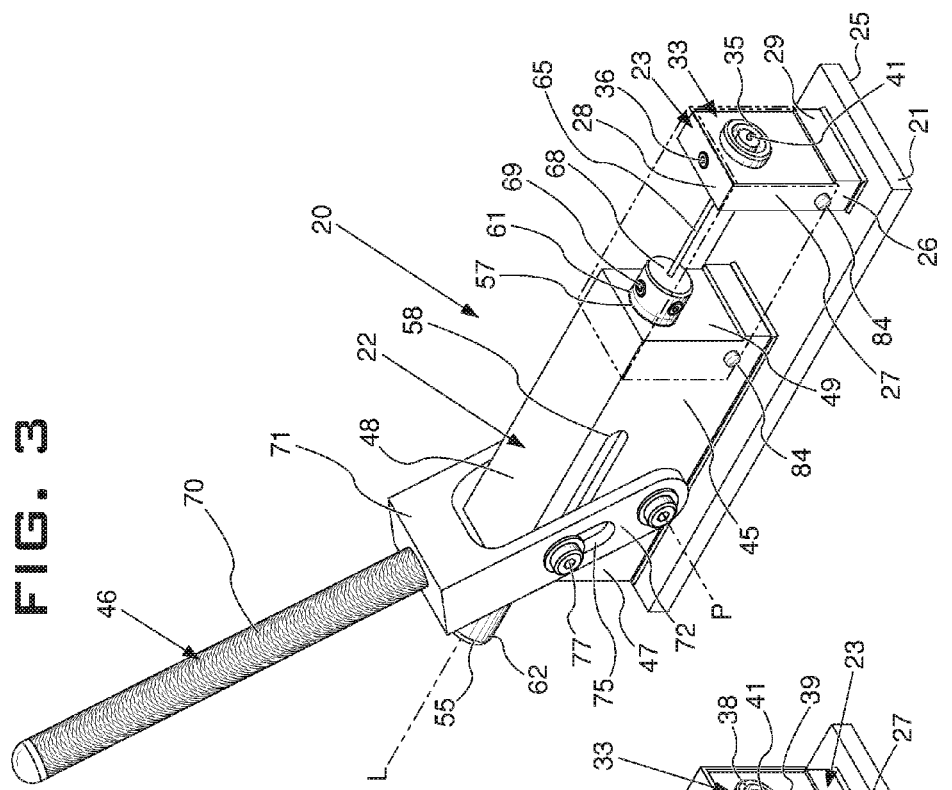
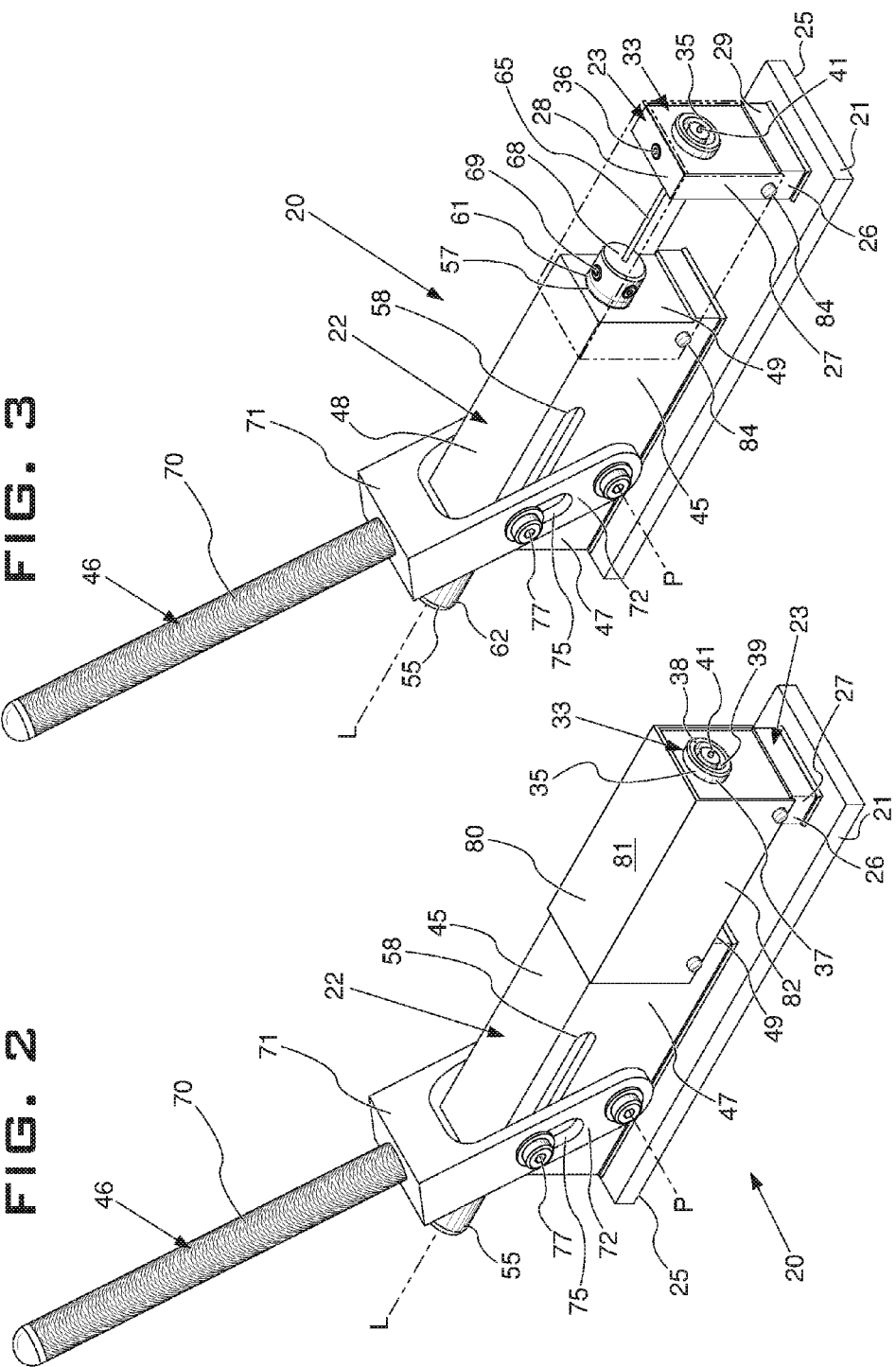

WIRE FEED TIP CLEANING APPARATUS

CLAIM FOR PRIORITY

This application is a U.S. national phase entry under 35 U.S.C. §371 from PCT International Application No. PCT/BR2012/1000401, filed Sep. 28, 2012, which claims benefit of priorty of Great Britain Patent Application No. 1116920.8 filed Sep. 30, 2011, the subject matter of both of which is incorporated herein by reference.

TECHNICAL FIELD

The present disclosure relates to a method and apparatus for cleaning a wire feed tip used in fabrication processes and more particularly to a method and apparatus for cleaning the interior of the wire feed tip.

BACKGROUND

The wire feed tips to which the present disclosure relates are those used in fabrication processes such as welding and, to a lesser extent brazing and soldering. Such processes usually employ a filler or joining material, typically in the form of a consumable metal wire that may be held within the wire feed tip and directed towards the work pieces to be joined. Since those wire feed tips are most commonly used in welding processes, such as for example gas metal arc welding (GMAW), the following description will relate specifically to welding, though it should be borne in mind that the present disclosure is in no way limited to such processes.

Briefly, unlike brazing and soldering, welding requires the surfaces of the work pieces to be melted and a filler material to be introduced to create a molten pool of material that may eventually cool to form a solid joint. The surfaces of the work pieces may be melted by the heat generated from a flame, an electric arc, laser or several other energy sources.

Referring again to GMAW, this technique uses an electric arc to generate heat and usually employs a welding gun connected to a spool of wire and a supply of inert gas. The welding gun includes the wire feed tip (also known as a welding tip) which may be an elongate unit made from copper (or other suitable material) and has a bore extending therethrough to accommodate the wire from the spool. Wire feed tips are commonly available in a range of sizes and styles so as to suit the size of the wire to be dispensed therefrom, which typically has a diameter in the range of 0.7 mm to 2.4 mm and for some applications as large as 4 mm. Further, the means by which the wire feed tip connects to the gun may also vary, but quite commonly it comprises a threaded portion at the rear which engages a threaded opening on the welding gun. The welding gun also includes a gas nozzle adjacent the wire feed tip and a welding shield that surrounds the gas nozzle and the wire feed tip so as to direct the gas towards the end of the wire and thus the work piece being welded.

Occasionally and particularly when the welding gun is too closely positioned to the work piece, weld splatter may adhere to the wire feed tip or the end of the wire may become so hot that it welds itself to the wire feed tip. These scenarios are particularly problematic since they may restrict or even prevent wire being dispensed from the wire feed tip. To address these problems, it is common to remove the welding shield and detach the wire feed tip from the welding gun so that it may be replaced or refurbished. Refurbishment usually includes grinding the end of the tip so as to remove the portion coated in weld splatter and thus reveal a new end with a clean bore. This process obviously reduces the length of the tip so can be carried out only a limited number of times before the tip becomes unusable.

It is a principal object of the present disclosure to overcome the problems outlined above.

SUMMARY OF THE DISCLOSURE

According to a first aspect of the disclosure, there is provided an apparatus for cleaning a wire feed tip having a bore extending therethrough, the apparatus comprising: support means adapted to hold the wire feed tip so that the bore is substantially coaxial with a first axis; a cleaning member having a cleaning portion, said cleaning portion being sized to locate within the bore of the wire feed tip and having an axis arranged coaxially with the first axis; and a control member drivingly coupled to one of the support means and the cleaning member and operable to effect relative translational movement of said support means and said cleaning member.

According to a second aspect of the disclosure, there is provided a method of cleaning a wire feed tip having a bore, the method comprising the steps of: providing an apparatus having wire feed tip support means, a cleaning member, and control means operable to effect relative translational movement of the wire feed tip support means and the cleaning member; securing the wire feed tip on the wire feed tip support means; and operating the control means so as to cause translational movement of the wire feed tip support means and the cleaning member, such that a portion of the cleaning means extends through the bore of the wire feed tip to dislodge any debris.

BRIEF DESCRIPTION OF THE DRAWINGS

FIG. 1 is a perspective view of a wire feed tip for attachment to a welding gun;

FIG. 2 is a perspective view of a cleaning apparatus arranged in its retracted position;

FIG. 3 is a perspective view corresponding to FIG. 2, but with the cover of the cleaning apparatus removed;

DETAILED DESCRIPTION

Figure 5:
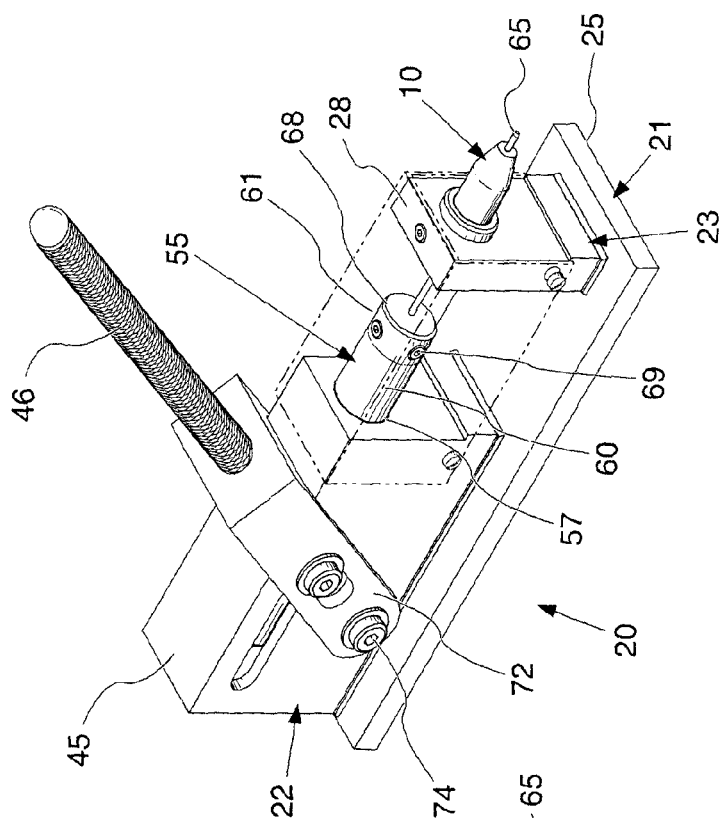
FIG. 5 is a perspective view corresponding to FIG. 4, but with the cover of the cleaning apparatus removed.

The following is a detailed description of exemplary embodiments of the present disclosure. The exemplary embodiments described therein and illustrated in the Figures are intended to teach the principles of the present disclosure, enabling those of ordinary skill in the art to implement and use the present disclosure in different environments and for many different processes. Therefore, the exemplary embodiments are not intended to be, and should not be considered as, a limiting description of the scope of patent protection. Rather, the scope of patent protection shall be defined by the appended claims.

FIG. 1 shows a wire feed tip 10 attachable to a welding gun (not shown) and arranged to direct welding wire (not shown) to the work piece (not shown) being welded. Such wire feed tips 10 may take many different shapes and sizes according to the welding gun to which they are to attach and the size of the welding wire to be dispensed. Generally, however, they are all tubular in nature and include an inlet at their rear end and an outlet at their front end. This particular wire feed tip 10 has a frusto-conical front portion 11, a cylindrical mid portion 12, a diametrically smaller rear portion 13 provided with an external thread 14, and a bore 17 extending through its centre. The end 15 of the frusto-conical front portion 11 is partially closed, but provided with a small exit hole 16 associated with the bore 17 and through which the welding wire is dispensed.

Figure 4:
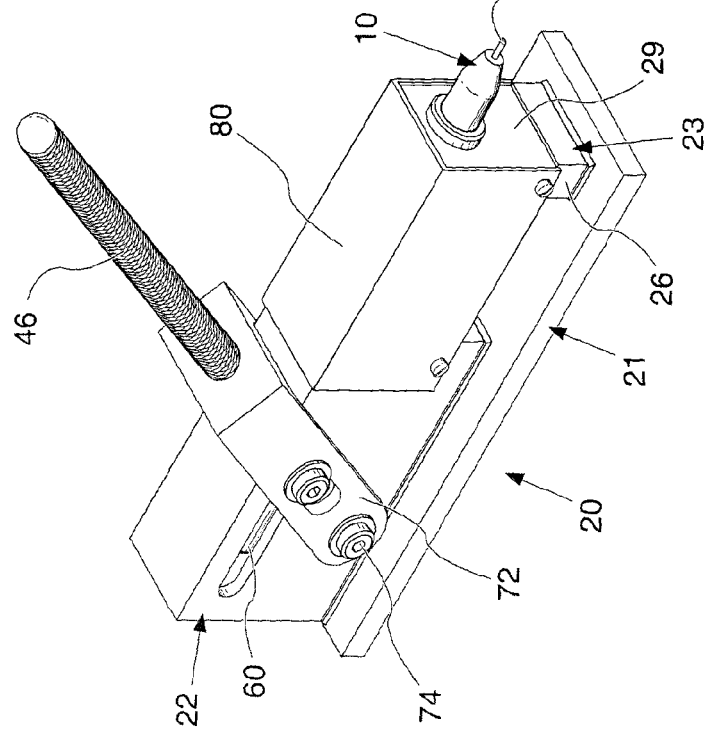
FIG. 4 is a perspective view of the cleaning apparatus of FIGS. 2 and 3 arranged in its extended position and with a wire feed tip attached.
Figure 6:
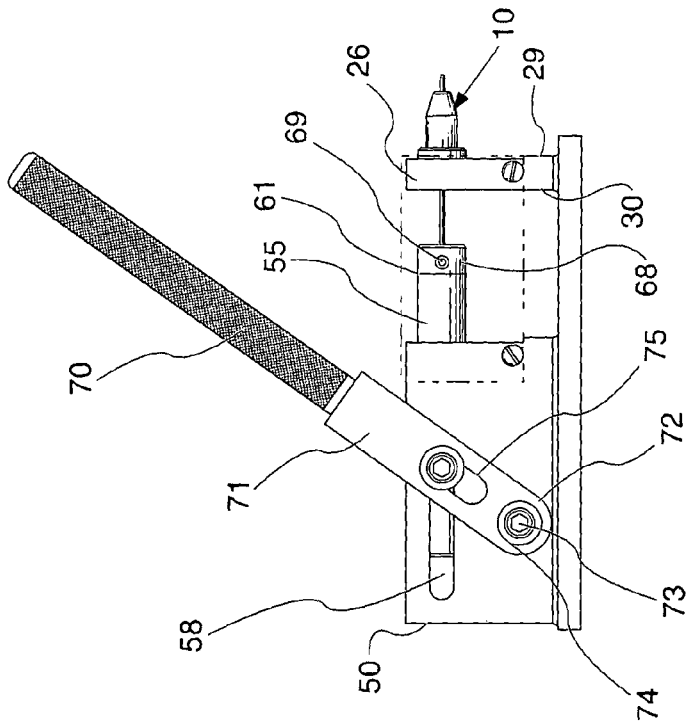
FIG. 6 is a side view of the cleaning apparatus in its retracted position with the cover removed and the wire feed tip attached.
Figure 7:
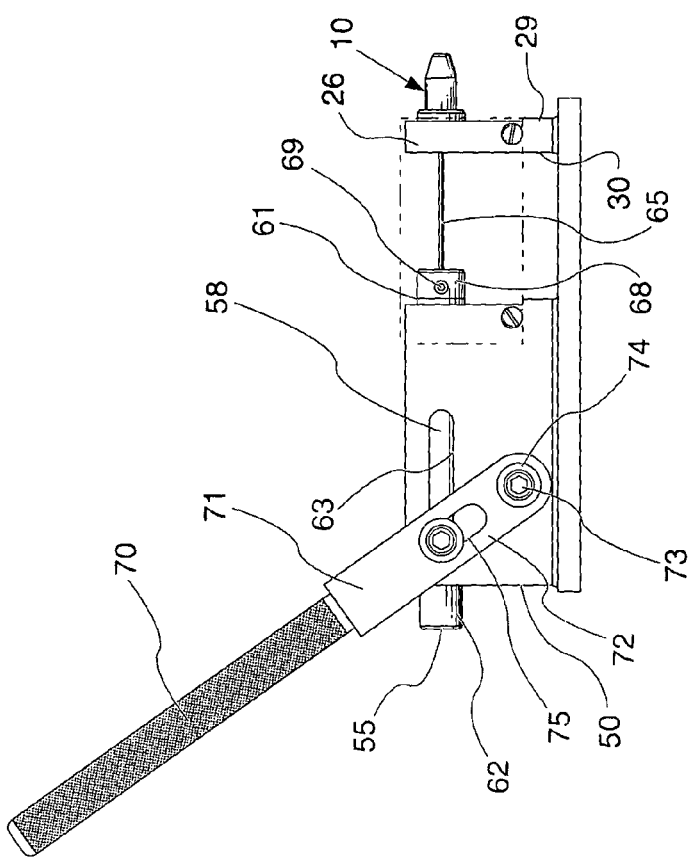
FIG. 7 is a side view corresponding to FIG. 6, but arranged in its extended configuration.

Referring now to FIGS. 2 to 7, there is shown a cleaning apparatus, generally indicated 20, for cleaning the bore 17 of the wire feed tip 10. The cleaning apparatus 20 may include a base 21 having a cleaning unit 22 and a support unit 23.

The base 21 may be generally planar and may have a substantially flat lower surface 25 which may be mounted to a work bench (not shown) and may be secured in place by bolts or other suitable fasteners (not shown). In an alternative embodiment, the base 21 may also be furnished with one or more legs (not shown) for elevating the cleaning apparatus 20 above ground level. The base 21 may be made from metal, plastics or other suitably stiff material to provide sufficient rigidity.

The support unit 23 may comprise a pillar 26 upstanding from the base 21 and possibly spaced from the cleaning unit 22. The pillar 26 may be integral to the base 21 or attached by fasteners, adhesive or other known suitable means (not shown). The pillar 26 may take any suitable shape, but in the exemplified embodiment it is generally rectangular in that it includes opposed side faces 27, a top face 28, a front face 29 and a rear face 30, which is proximal to the cleaning unit 22. The pillar 26 may have a receptacle 33 to which the wire feed tip 10 may be attached and which may comprise an opening extending through the front and rear faces 29,30 for receiving the rear portion 13 of the wire feed tip 10. To secure the wire feed tip 10 in position, the opening may be threaded for engagement with the external thread 14 of the wire feed tip 10. In a more basic arrangement, the opening may be sized to allow the rear portion 13 to pass therethrough and the wire feed tip 10 may be secured in place by a nut (not shown) presented to the rear face 30 for engagement with the external thread 14.

Referring again to the exemplified embodiment, the receptacle 33 may be furnished with a circular insert 35 that may have a circumferential outer face (not shown) provided with threads for engagement with threads formed within the receptacle. Additionally or alternatively, the insert may be clamped in the required position by a grub screw 36, or like fastener, extending through the top face 28 of the pillar 26 and engaging the insert 35. The insert 35 may define an annular wall 37 adapted to extend forward of the front face 29 and a circular land 38 disposed within the annular wall 37, and arranged possibly concentrically thereto. The annular wall 37 and the circular land 38 may define an annular recess 39 in which the rear portion 13 of the wire feed tip 10 may locate and the internal face of the annular wall 37 may be threaded to engage the external threads 14 provided on the wire feed tip 10. The circular land 38 may be provided with a through hole 41 for receiving a needle 65 associated with the cleaning unit 22 to be discussed in more detail below. The insert 35 may be interchangeable to accommodate wire feed tips 10 of different sizes.

The cleaning unit 22 may comprise a cleaning body 45 upstanding from the base 21 and a control member 46 pivoted to the cleaning body 45. The cleaning body 45 may be integral to the base 21 or may be attached to the base 21 by known suitable means, for example, by welding, adhering or fastening. For instance, the cleaning body 45 may be attached to the base 21 by screws (not shown) passing through the lower face (not shown) of the base 21 and into a lower face (not shown) of the body 45. In this embodiment the cleaning body 45 is generally cuboidal and as such has opposed side faces 47, an upper face 48, a lower face (not shown), a first end 49 proximal to the support unit 23 and a second end 50 distal to the support unit 23.

The cleaning body 45 may be provided with a channel (not shown) for receiving a cleaning member 55. The channel may be substantially linear and may be formed such that its longitudinal axis L extends through the cleaning unit 22, the support unit 23 and the space therebetween. The channel may have a first open end 57 defined in the first end 49 and a second open end (not shown) defined in the second end 50. In one embodiment the second open end of the channel may be closed so as to serve as an end stop for the cleaning member 55 located therein. The channel may have a substantially circular cross-section, though alternative shapes are possible. A slot 58 may be formed in each side face 47 of the cleaning body 45 and arranged in communication with the channel. Furthermore, the slots 58 may be the same size and may be located at corresponding positions on their respective side faces 47.

The cleaning member 55 may have a cross-section selected so as to locate within and slide along the channel. The cross-section of the cleaning member 55 may be selected so as to correspond substantially to the cross-section of the channel and form a close running fit therewith. The cleaning member 55 may include a first end 61 proximal to the first open end 57 of the channel, a second end 62 proximal to the second end of the channel and a peripheral surface 63 extending between the two ends.

The first end 61 of the cleaning member 55 may be furnished with an elongate cleaning tool, in the form of a needle 65 arranged to extend coaxially to the longitudinal axis L. The needle 65 may be arranged to locate within and clean debris from the bore 17 of the wire feed tip 10 and therefore the size and shape of the needle 65 may be selected according to the size and shape of the wire feed tip 10 to be cleaned. In order for the needle 65 to withstand the forces to which it may be subject when urged into the bore 17 of the wire feed tip 10, it may be reasonably rigid and robust and possibly made from steel or another suitable material exhibiting those characteristics. The needle 65 may also be provided with an abrasive finish to assist with the removal of debris. The length of the needle 65 may vary, but may be at least as long as the bore 17 so that the free end of the needle 65 reaches the small exit hole 16 of the wire feed tip 10. Indeed, the needle 65 may need to be significantly longer than the bore 17 if the cleaning member 55 does not extend to the support unit 23 in its fully extended position, to be discussed below.

The needle 65 may be integral to the cleaning member 55 or detachably mounted thereto. A detachable needle 65 may be easily replaced by an identical needle when damaged or by a different size needle when a different size wire feed tip 10 requires cleaning. In the embodiment shown in FIGS. 2 to 7, the cleaning member 55 is furnished with a cap 68 disposed over the first end 61 and the needle 65 extends concentrically from the centre of the cap 68. The first end 61 may be diametrically smaller than the remainder of the cleaning member 55 in order to receive the cap 68, which may have an external diameter substantially equal to that of the remainder of the cleaning member 55. The cap 68 may be secured to the first end 61 by grub screws 69, adhesive or other suitable means.

The control member 46 may comprise any suitable means for effecting translational movement of the cleaning member 55 in a reciprocating manner. In the present embodiment shown in the drawings it comprises a lever pivoted to the cleaning body 45 and coupled to the cleaning member 55. The lever includes an arm 70 having a lower end furnished with a fork 71 defining two limbs 72 that straddle the cleaning body 45. The free ends of the limbs 72 may be provided with coaxial holes (not shown) that receive a pivot pin 73 arranged to extend through a pivot bore (not shown) formed in the cleaning body 45. The ends of the pivot pin 73 may be threaded to receive nuts 74 to restrict inadvertent removal of the control member 46 from the cleaning body 45.

The limbs 72 may be provided with apertures 75 which may be of a similar size and may be arranged in corresponding positions along the length of the limbs 72. The apertures 75 may be elongate and may extend radially along the limbs relative to the pivot axis P, such that a portion of each aperture 75 may lie in registration with a portion of a respective slot 58 formed in an adjacent side face 47 of the cleaning body 45, at least for a predefined range of pivot angles of the control member 46. The control member 46 may be drivingly coupled to the cleaning member 55. For example, projections (not shown) may extend from opposed sides of said cleaning member 55, through adjacent slots 58 in the side faces 47 of the cleaning body 45 and finally through the apertures 75 in the limbs 72 of the fork 71. The projections may have threaded ends (not shown) that may be furnished with nuts 77 or like captive devices. In the present embodiment, a bore (not shown) is formed through the cleaning member 55 and a pin (not shown) extends through that bore such that its ends emerge from diametrically opposed locations on the cleaning member 55 before passing through the slots 58 in the side faces 47 and the apertures 75 in the limbs 72. The ends of the pin define the projections, and at least the very ends of which may be provided with a thread for engaging the nuts 77.

The cleaning apparatus 20 may also be furnished with a detachable cover 80 which may be mounted to the cleaning body 45 and the pillar 26 to conceal the space therebetween, or more particularly, the moving parts, such as the cleaning member 55 located in that space. The cover 80 may take many suitable forms, but in this embodiment it comprises a U-shape channel having a central portion 81 and two sides 82. The U-shape channel may be inverted such that the central portion 81 may rest on the top face 48, 28 of the cleaning body 45 and the pillar 26, while the sides 82 depend downwardly so as to be fastened to the side faces 47,27 of the cleaning body 45 and the pillar 26 by screws 84.

In an alternative embodiment not shown, the control member 46 may be adapted to effect translational movement and rotational movement of the cleaning member 55. This might be achieved by dividing the cleaning member 55 into a translational portion and a rotational portion arranged end to end. The translational portion may be located in the channel and may be coupled to the control member 46 in the above described manner. The rotational portion may have one end coupled to the adjacent end of the translational portion so as to allow relative rotational movement of those portions while not allowing relative translational movement of those portions. The other end of the rotational portion may be provided with the needle 65 in the same manner as described above. A helical groove may be formed in the circumferential face of the rotational portion and a projection may be provided in the channel so as to locate within the groove.

Thus as the control member is driven towards its extended position, the translational portion and therefore the rotational portion are driven along the channel towards the support unit 23. However, as the rotational portion starts to move along the channel, the projection rides along the helical groove so as to cause the rotational portion also to rotate. Since the needle 65 is fixed to the rotational portion, it too rotates as it moves through the bore of the wire feed tip 10.

INDUSTRIAL APPLICABILITY

Prior to use, the size of the needle 65 should be checked to ensure it corresponds to the size of the bore 17 of the wire feed tip 10 to be cleaned. If necessary the needle 65 should be replaced, which first requires the cover 80 to be removed by releasing the screws 84 and lifting the cover 80 upwardly above the cleaning unit 22 and the support unit 23 until the sides 82 are free. The needle 65 may then be accessed to enable the grub screws 69 to be released and the cap 68 urged towards the support unit 23 while restricting forward movement of the control member 46. A different needle 65 may then be attached by locating the cap 68 over the first end 61 of the main portion 60 and then tightening the grub screws 69. The cover 80 may then be replaced.

It may also be necessary to replace the insert 35 in the event that the needle 65 does not fit within the through hole 41 or the wire feed tip 10 does not fit within the annular recess 39. The insert 35 may be replaced by releasing the grub screw 36 and subsequently twisting the insert 35 counter-clockwise. The replacement insert 35 may then be presented to the opening and then twisted clockwise until the threads fully engage, before finally tightening the grub screw 36.

The wire feed tip 10 may then be fitted to the cleaning apparatus 20 by locating the rear portion 13 into the annular recess 39 and then twisting the wire feed tip 10 in the clockwise direction to enable the external threads 14 to engage fully with those formed on the internal face of the annular wall 37.

To clean the bore 17 of the wire feed tip 10 supported in the insert 35, the arm 70 should be arranged in its retracted position whereat the pin through the cleaning member 55 is at the end of the slot 58 proximal to the second end 50 of the cleaning body 45. Thence, the arm may be pivoted forward until the pin reaches the end of the slots 58 proximal to the first end 49 of the cleaning body 45, which in turn drives the cleaning member 55 forward toward the support unit 23. As the cleaning member 55 is driven forward, the needle 65 enters the bore 17 of the wire feed tip 10 and dislodges any debris set therewithin. If significant resistance occurs, it may be necessary to pivot the arm 70 alternately between the retracted and the extended positions so as to drive the needle 65 reciprocatively along the bore 17. This may also be necessary to remove any previously dislodged debris from the bore 17.

The invention claimed is:

1. An apparatus for cleaning a wire feed tip having a bore extending therethrough, the apparatus comprising:
   a support unit adapted to hold the wire feed tip so that the bore is substantially coaxial with a first axis;

a cleaning member having an elongate cleaning portion, the cleaning portion being sized to locate within the bore of the wire feed tip and arranged coaxially with the first axis;

a control member drivingly coupled to the cleaning member and operable to effect translational movement of the cleaning member relative to the support unit;

a base including a cleaning body and a support body spaced apart along the first axis, the cleaning body supporting the cleaning member and the support body defining the support unit; and a coupling comprising an aperture defined on one of the control member and the cleaning member and a projection provided on the other of the control member and the cleaning member, the projection locates within the aperture and through which coupling the driving movement of the control member is converted to translational movement of the cleaning member.

2. An apparatus as claimed in claim 1, wherein the aperture is formed on the control member and is generally elongate so as to have a long dimension extending in a radial direction relative to a pivot axis of the control member to allow the projection to move along the aperture as the control member is pivoted.

3. An apparatus as claimed in claim 1, wherein the cleaning body includes a channel and at least one opening in communication with the channel for slidably receiving the projection.

4. An apparatus as claimed in claim 1, wherein the control member comprises a lever having a fork at one end defining two limbs with free ends pivoted to the base and being disposed on opposed sides of the cleaning body, at least one of said limbs being provided with one of said aperture and said projection.

5. An apparatus for cleaning a wire feed tip having a bore extending therethrough, the apparatus comprising:

a support unit adapted to hold the wire feed tip so that the bore is substantially coaxial with a first axis;

a cleaning member having an elongate cleaning portion, said cleaning portion being sized to locate within the bore of the wire feed tip and arranged coaxially with the first axis;

a control member drivingly coupled to the cleaning member and arranged to effect translational movement of the cleaning member relative to the support member; and a coupling comprising an aperture defined on one of the control member and the cleaning member and a projection provided on the other of the control member and the cleaning member, the projection locates within the aperture and through which coupling the driving movement of the control member is converted to translational movement of the cleaning member.

6. An apparatus for cleaning a wire feed tip having a bore extending therethrough, the apparatus comprising:

a support unit adapted to hold the wire feed tip so that the bore is substantially coaxial with a first axis;

a cleaning member having an elongate cleaning portion, said cleaning portion being sized to locate within the bore of the wire feed tip and arranged coaxially with the first axis;

a control member drivingly coupled to the cleaning member and arranged to effect translational movement of the cleaning member relative to the support member; and wherein the aperture is formed on the control member and is generally elongate so as to have a long dimension extending in a radial direction relative to a pivot axis of the control member to allow a projection to move along the aperture as the control member is pivoted.

* * * * *